United States Patent
Miller et al.

(10) Patent No.: US 11,757,632 B2
(45) Date of Patent: Sep. 12, 2023

(54) GENERATING A RANDOM VALUE BASED ON A NOISE CHARACTERISTIC OF A MEMORY CELL

(71) Applicant: Micron Technology, Inc., Boise, ID (US)

(72) Inventors: David L. Miller, Boise, ID (US); Michael T. Brady, Loveland, CO (US)

(73) Assignee: Micron Technology, Inc., Boise, ID (US)

( * ) Notice: Subject to any disclaimer, the term of this patent is extended or adjusted under 35 U.S.C. 154(b) by 1015 days.

(21) Appl. No.: 16/226,558

(22) Filed: Dec. 19, 2018

(65) Prior Publication Data

US 2020/0204367 A1  Jun. 25, 2020

(51) Int. Cl.
| | |
|---|---|
| *H04L 9/08* | (2006.01) |
| *G06F 3/06* | (2006.01) |
| *G06F 21/60* | (2013.01) |
| *G11C 16/26* | (2006.01) |
| *G11C 16/34* | (2006.01) |
| *G11C 16/04* | (2006.01) |

(52) U.S. Cl.
CPC .......... *H04L 9/0869* (2013.01); *G06F 3/0619* (2013.01); *G06F 3/0659* (2013.01); *G06F 3/0673* (2013.01); *G06F 21/602* (2013.01); *G11C 16/26* (2013.01); *G11C 16/34* (2013.01); *G11C 16/0483* (2013.01)

(58) Field of Classification Search
CPC ... H04L 9/0869; G06F 3/0619; G06F 3/0659; G06F 3/0673; G06F 21/602; G11C 16/26; G11C 16/34; G11C 16/0483
See application file for complete search history.

(56) References Cited

U.S. PATENT DOCUMENTS

| | | | | |
|---|---|---|---|---|
| 6,195,669 | B1* | 2/2001 | Onodera | G06F 7/588 |
| | | | | 708/250 |
| 10,372,528 | B1* | 8/2019 | Anderson | G06F 21/00 |
| 2003/0145243 | A1* | 7/2003 | Aikawa | G06F 21/755 |
| | | | | 713/400 |

(Continued)

FOREIGN PATENT DOCUMENTS

| | | |
|---|---|---|
| CN | 103403670 A | 11/2013 |
| CN | 103578550 A | 2/2014 |

OTHER PUBLICATIONS

Machine translation of Korean patent application KR 145647, OH, Eun Chu (Year: 2018).*

*Primary Examiner* — Theodore C Parsons
*Assistant Examiner* — Alan L Kong
(74) *Attorney, Agent, or Firm* — Lowenstein Sandler LLP

(57) ABSTRACT

A request to generate one or more random values can be received. In response to receiving the request to generate the one or more random values, a first read operation can be performed on a memory cell of the memory component to retrieve first data and a second read operation can be performed on the same memory cell of the memory component to retrieve second data. The first data can be compared with the second data to identify a difference between the first data and the second data. The difference can be associated with a noise characteristic of the memory cell. The one or more random values can be generated based on the difference between the first data and the second data that is associated with the noise characteristic of the memory cell.

20 Claims, 8 Drawing Sheets

(56) References Cited

U.S. PATENT DOCUMENTS

| | | |
|---|---|---|
| 2003/0185392 A1* | 10/2003 | Sun .................... H04L 9/00 380/46 |
| 2006/0123072 A1* | 6/2006 | Onaya ............... H04L 9/0662 708/250 |
| 2008/0301210 A1 | 12/2008 | Dover |
| 2009/0165086 A1* | 6/2009 | Trichina ............ G06F 7/588 708/250 |
| 2010/0306296 A1* | 12/2010 | Inglett ............... G06F 7/582 708/255 |
| 2011/0123022 A1* | 5/2011 | Oishi ................ G06F 7/588 380/46 |
| 2015/0095550 A1* | 4/2015 | Khan ................. G06F 3/0647 711/103 |
| 2015/0193204 A1 | 7/2015 | Lin et al. |
| 2016/0028544 A1* | 1/2016 | Hyde ................. H04L 9/085 711/112 |
| 2017/0161022 A1 | 6/2017 | Chen et al. |
| 2017/0301406 A1* | 10/2017 | Wong ............... H01L 27/11558 |
| 2018/0287793 A1* | 10/2018 | Khatib Zadeh .... G11C 13/0004 |
| 2019/0182054 A1* | 6/2019 | Leobandung ......... H04L 9/3278 |
| 2020/0167290 A1* | 5/2020 | Oh .................... G11C 7/24 |

\* cited by examiner

GENERATING A RANDOM VALUE BASED ON A NOISE CHARACTERISTIC OF A MEMORY CELL

TECHNICAL FIELD

The present disclosure generally relates to a memory sub-system, and more specifically, relates to the generating of a random value based on a noise characteristic of a memory cell in memory sub-systems.

BACKGROUND

A memory sub-system can be a storage system, such as a solid-state drive (SSD). A memory sub-system can be a memory module, such as a dual in-line memory module (DIMM), a small outline DIMM (SO-DIMM), or a non-volatile dual in-line memory module (NVDIMM). A memory sub-system can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The present disclosure will be understood more fully from the detailed description given below and from the accompanying drawings of various implementations of the disclosure.

DETAILED DESCRIPTION

Figure 1:
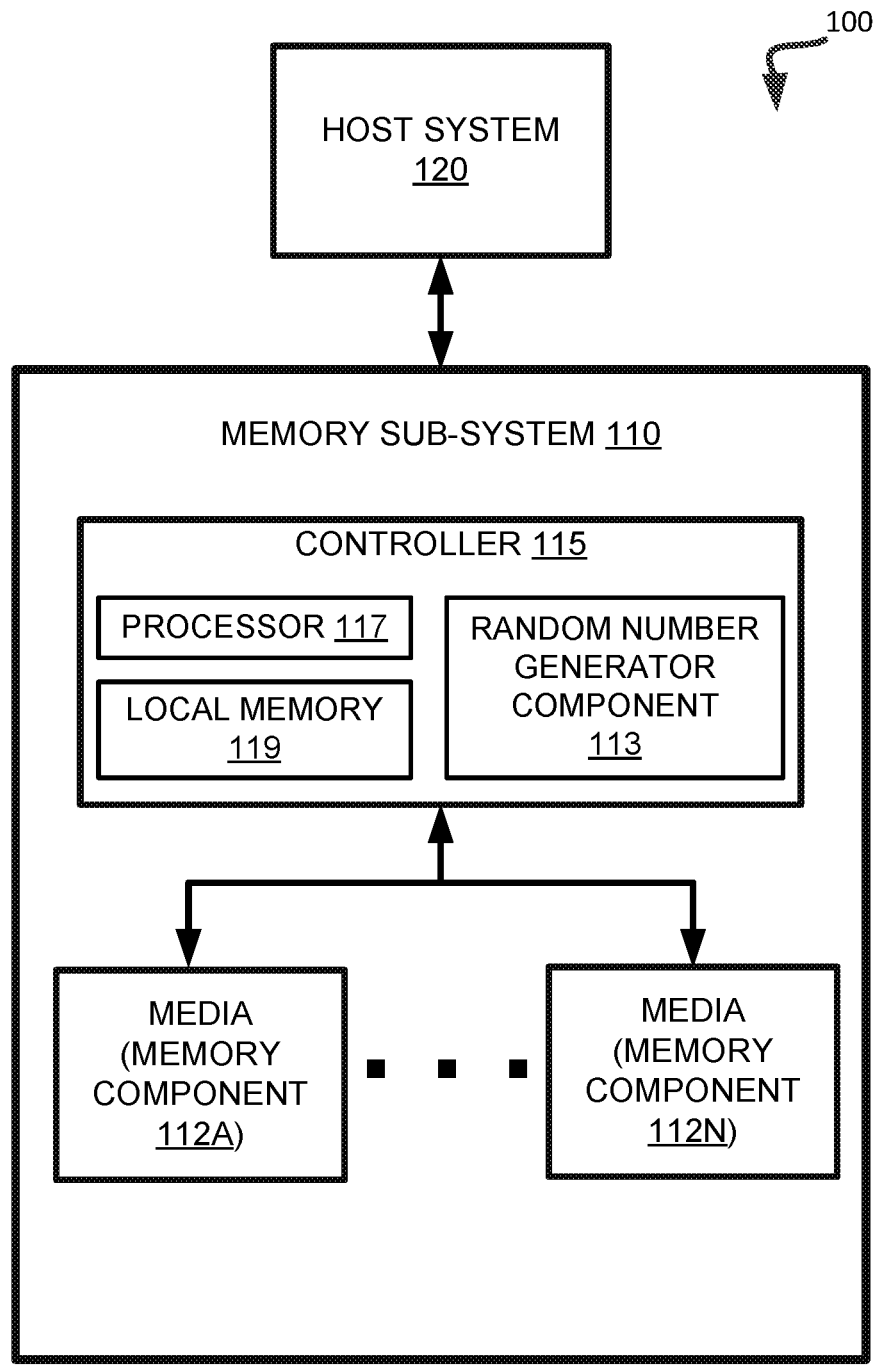
FIG. 1 illustrates an example computing environment that includes a memory sub-system in accordance with some embodiments of the present disclosure.

Aspects of the present disclosure are directed to generating a random value based on a noise characteristic of a memory cell in a memory sub-system. A memory sub-system is also hereinafter referred to as a "memory device." An example of a memory sub-system is a storage device that is coupled to a central processing unit (CPU) via a peripheral interconnect (e.g., an input/output bus, a storage area network). Examples of storage devices include a solid-state drive (SSD), a flash drive and a universal serial bus (USB) flash drive. Another example of a memory sub-system is a memory module that is coupled to the CPU via a memory bus. Examples of memory modules include a dual in-line memory module (DIMM), a small outline DIMM (SO-DIMM), a non-volatile dual in-line memory module (NVDIMM), etc. The memory sub-system can be a hybrid memory/storage sub-system. In general, a host system can utilize a memory sub-system that includes one or more memory components. The host system can provide data to be stored at the memory sub-system and can request data to be retrieved from the memory sub-system.

The storing or requesting of data by the host system can be based on random values (i.e., random numbers). For example, in a conventional memory sub-system, the data stored at the memory components can be encrypted by utilizing a random value during an encryption operation. The host system can utilize a pseudorandom number generator (PRNG) to generate the random values. For example, the host system can provide a seed or initial value to the pseudorandom number generator and the PRNG can proceed to output a sequence of values based on the initial value. The PRNG can be implemented as a software algorithm or hardware component at the host system. However, the PRNG can be considered to be deterministic as the output of the PRNG is based on the initial value that is provided to the PRNG. Thus, the values from the PRNG are pseudorandom and not truly random values. For example, the values from the PRNG are not truly random values as the output of the PRNG can be predicted if the initial conditions of the PRNG are known (e.g., the implementation of the PRNG itself, the seed or initial value, etc.). In contrast, a truly random value can be a value that is generated such that the conditions at which the value is generated are unknown or untraceable.

Aspects of the present disclosure address the above and other deficiencies by generating a random value based on a noise characteristic of a memory cell in a memory sub-system. For example, the memory cells of the memory sub-system can exhibit a noise characteristic that can be used to generate a random value. The noise characteristic can be a random telegraph noise (RTN) of a memory cell that is included in the memory sub-system. Random telegraph noise can be electronic noise that occurs from the semiconductor material of the memory cell. The RTN can be observed as an unpredictable voltage transition such that the time or occurrence of the voltage transition and magnitude of the voltage transition is random or unknown before being observed. In some embodiments, the noise characteristic can be a combination of the RTN and other electrical or thermal noise of the memory cell.

The noise characteristic can be observed by performing multiple read operations of a memory cell. For example, a first read operation can be performed on a memory cell to retrieve a first value that is indicative of data that was previously stored at the memory cell. The first value can be a version of the retrieved data before or without any error correction operation being performed for the data. In general, the error correction operation detects and corrects any bit values of the data that have changed (e.g., from a 0 to a 1 or vice versa) as a result of noise that occurs during the performance of a read operation. A second read operation can also be performed on the same memory cell to retrieve a second value that is indicative of the same data that was stored at the memory cell. The second read operation can also be performed before or without any error correction operation. The first value from the first read operation can then be compared with the second value from the second read operation to determine any differences between the first value and the second value. The differences can then be used to generate one or more random values. Since the first value and the second value represent the same stored data and are compared without any error correction operation being performed, the differences between the first value from the first read operation and the second value from the second read operation can be a result of the noise characteristic of the memory cell.

In some embodiments, the random value can be generated based on noise characteristics of multiple memory cells of the memory sub-system. For example, a first noise characteristic of a first memory cell and a second noise characteristic of a second memory cell can be observed. The first noise characteristic can be compared with the second noise characteristic to determine a difference between the two noise characteristics of the two memory cells. The random value can then be generated based on the difference between the noise characteristics. As described in further detail below, the noise characteristics can be asynchronous signals that are used to generate a synchronous random value.

Advantages of the present disclosure include, but are not limited to, the improved security for operations that utilize random values. For example, since the random values are generated based on a noise characteristic of a memory cell that is unpredictable and unknown before being observed, the random value can be truly random as opposed to a pseudorandom number. Thus, if a cryptographic operation (e.g., an encryption operation) utilizes the random number to store data at the memory sub-system, the stored data can be considered to be more secure as the data was encrypted with a more secure cryptographic operation that is based on a truly random number. Other such applications or uses of the random values can also thus be considered to be more secure or have improved performance. For example, the utilization of random values in simulations (e.g., Monte Carlo methods), gaming environments (e.g., gambling or other such games), etc. can also be improved as the random value that is utilized is truly random.

Furthermore, since the generation of the random value can be based on the noise characteristic of a memory cell as opposed to a pseudorandom number generator implemented in software or as a hardware component at the host system, the functionality of the pseudorandom number generator can be removed from the host system as the memory sub-system can provide the functionality by utilizing the noise characteristics of memory cells. Thus, the complexity of the host system can be reduced and the memory sub-system can provide the random values to the host system in addition to any stored data.

FIG. 1 illustrates an example computing environment 100 that includes a memory sub-system 110 in accordance with some embodiments of the present disclosure. The memory sub-system 110 can include media, such as memory components 112A to 112N. The memory components 112A to 112N can be volatile memory components, non-volatile memory components, or a combination of such. In some embodiments, the memory sub-system is a storage system. An example of a storage system is a SSD. In some embodiments, the memory sub-system 110 is a hybrid memory/storage sub-system. In general, the computing environment 100 can include a host system 120 that uses the memory sub-system 110. For example, the host system 120 can write data to the memory sub-system 110 and read data from the memory sub-system 110.

The host system 120 can be a computing device such as a desktop computer, laptop computer, network server, mobile device, or such computing device or microcontroller that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. As used herein, "coupled to" generally refers to a connection between components, which can be an indirect communicative connection or direct communicative connection (e.g., without intervening components), whether wired or wireless, including connections such as electrical, optical, magnetic, etc. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Recommended Standard (RS)-232, Industry Standard Architecture (ISA), parallel, Controller Area Network (CAN), universal asynchronous receiver-transmitter (UART), etc. The physical host interface can be used to transmit data between the host system 120 and the memory sub-system 110. The host system 120 can further utilize an NVM Express (NVMe) interface to access the memory components 112A to 112N when the memory sub-system 110 is coupled with the host system 120 by the PCIe interface. The physical host interface can provide an interface for passing control, address, data, and other signals between the memory sub-system 110 and the host system 120.

The memory components 112A to 112N can include any combination of the different types of non-volatile memory components and/or volatile memory components. An example of non-volatile memory components includes a negative-and (NAND) type flash memory. Each of the memory components 112A to 112N can include one or more arrays of memory cells such as single level cells (SLCs) or multi-level cells (MLCs) (e.g., triple level cells (TLCs) or quad-level cells (QLCs)). In some embodiments, a particular memory component can include both an SLC portion and a MLC portion of memory cells. Each of the memory cells can store one or more bits of data (e.g., data blocks) used by the host system 120. Although non-volatile memory components such as NAND type flash memory are described, the memory components 112A to 112N can be based on any other type of memory such as a volatile memory. In some embodiments, the memory components 112A to 112N can be, but are not limited to, random access memory (RAM), read-only memory (ROM), dynamic random access memory (DRAM), synchronous dynamic random access memory (SDRAM), phase change memory (PCM), magneto random access memory (MRAM), negative-or (NOR) flash memory, electrically erasable programmable read-only memory (EEPROM), and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. Furthermore, the memory cells of the memory components 112A to 112N can be grouped as memory pages or data blocks that can refer to a unit of the memory component used to store data.

The memory system controller 115 (hereinafter referred to as "controller") can communicate with the memory components 112A to 112N to perform operations such as reading data, writing data, or erasing data at the memory components 112A to 112N and other such operations. The controller 115 can include hardware such as one or more integrated circuits and/or discrete components, a buffer memory, or a combination thereof. The controller 115 can be a microcontroller, special purpose logic circuitry (e.g., a field programmable gate array (FPGA), an application specific integrated circuit (ASIC), etc.), or other suitable processor. The controller 115 can include a processor (processing device) 117 configured to execute instructions stored in local memory 119. In the illustrated example, the local memory 119 of the controller 115 includes an embedded memory configured to store instructions for performing various processes, operations, logic flows, and routines that control operation of the memory sub-system 110, including handling communications between the memory sub-system 110 and the host system 120. In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the controller 115, in another embodiment of the present disclosure, a memory sub-system 110 may not include a controller 115, and may instead rely upon external control (e.g., provided by an external host, or by a processor or controller separate from the memory sub-system).

In general, the controller 115 can receive commands or operations from the host system 120 and can convert the commands or operations into instructions or appropriate commands to achieve the desired access to the memory components 112A to 112N. The controller 115 can be responsible for other operations such as wear leveling operations, garbage collection operations, error detection and error-correcting code (ECC) operations, encryption operations, caching operations, and address translations between a logical block address and a physical block address that are associated with the memory components 112A to 112N. The controller 115 can further include host interface circuitry to communicate with the host system 120 via the physical host interface. The host interface circuitry can convert the commands received from the host system into command instructions to access the memory components 112A to 112N as well as convert responses associated with the memory components 112A to 112N into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the controller 115 and decode the address to access the memory components 112A to 112N.

The memory sub-system 110 includes a random number generator component 113 that can be used to generate one or more random values. In some embodiments, the controller 115 includes at least a portion of the random number generator component 113. For example, the controller 115 can include a processor 117 (processing device) configured to execute instructions stored in local memory 119 for performing the operations described herein. In some embodiments, the random number generator component 113 is part of the host system 120, an application, or an operating system.

The random number generator component 113 can receive a value that is based on a noise characteristic of a memory cell that is included in one of the memory components 112A to 112N of the memory sub-system 110. The random number generator component 113 can generate a random value based on the noise characteristic of the memory cell. Furthermore, the random number generator component 113 can adjust an operation of the memory sub-system 110 when generating the random value. Further details with regards to the operations of the random number generator component 113 are described below.

Figure 2:
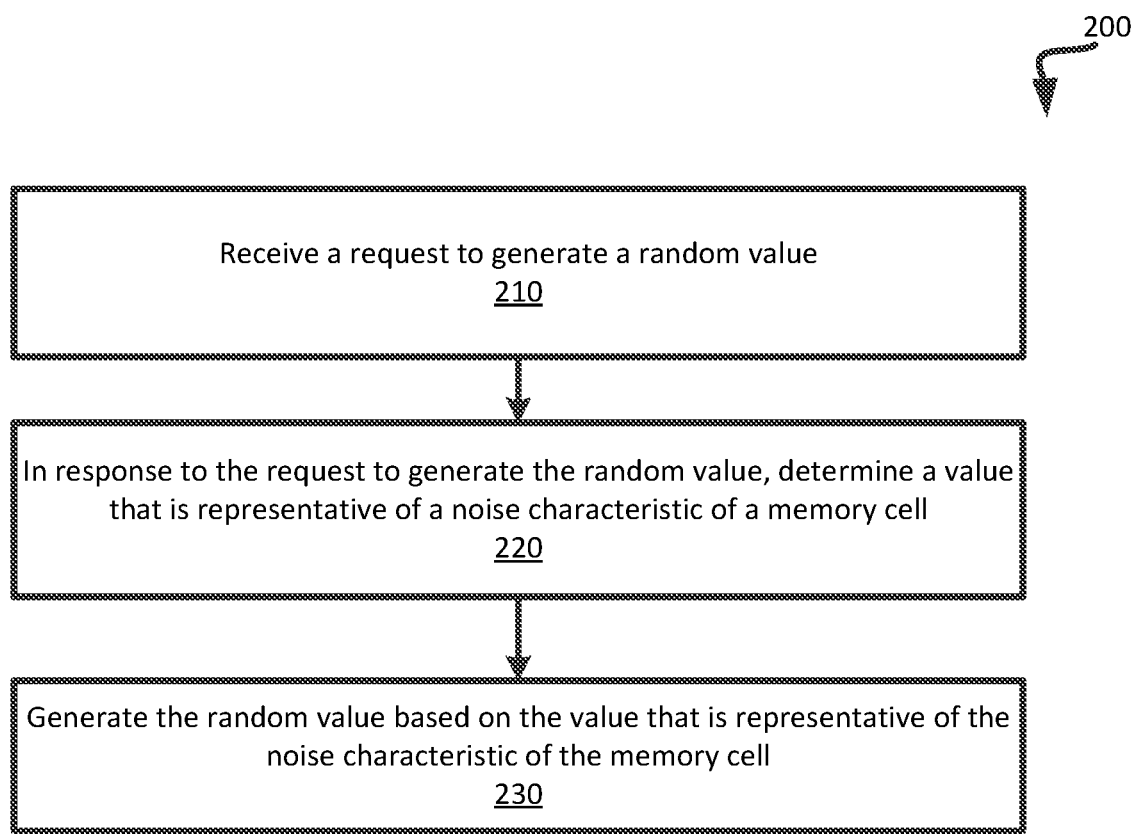
FIG. 2 is a flow diagram of an example method to generate a random value based on a noise characteristic of a memory cell in accordance with some embodiments.

FIG. 2 is a flow diagram of an example method 200 to generate a random value based on a noise characteristic of a memory cell in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the random number generator component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

As shown in FIG. 2, at operation 210, the processing logic receives a request to generate a random value. The request can be received from a host system. For example, the request can identify that an operation of the host system is to utilize a random value. In some embodiments, the request to generate the random value can be received in response to the host system providing data to be stored at the memory sub-system in an encrypted format. The request can be received in response to any cryptographic operation that is to be performed with the data that is provided to the memory sub-system.

At operation 220, the processing logic determines a value that is representative of a noise characteristic of a memory cell in response to the request to generate the random value. For example, the value can be a difference between data of two read operations that have been performed on the memory cell. Further details with respect to determining the value based on the difference between data of two read operations are further described in conjunction with FIGS. 3 and 4. In some embodiments, the value can be a difference between the noise characteristic of the memory cell and another noise characteristic of another memory cell. Further details with respect to determining the value based on the difference between noise characteristics of memory cells are described in conjunction with FIGS. 5 and 6.

In some embodiments, a predefined group of memory cells can be used to determine the value that is representative of the noise characteristic of a memory cell. For example, data can be generated and stored at the memory cells of the predefined group of memory cells before a random number is generated based on the noise characteristics. For example, the controller of the memory sub-system can generate the data and store the data at the memory cells. When the value that is representative of the noise characteristic is to be determined, a particular memory cell or memory cells of the predefined group of memory cells can be selected for use in determining the value. In some embodiments, a different memory cell from the predefined group of memory cells can be selected for each subsequent random value that is to be generated. Thus, the different memory cells from the predefined group can be cycled through in response to repeated requests to generate repeated random values. Furthermore, in some embodiments, the predefined group of memory cells can be memory cells that are not to store data from the host system.

At operation 230, the processing logic generates the random value based on the value that is representative of the noise characteristic of the memory cell. Subsequently, the random value can be used to encrypt data from the host system. For example, the random value that is based on the noise characteristic of the memory cell of the memory sub-system can be used to encrypt data from the host system that is to be stored at other memory cells of the memory sub-system. In some embodiments, the random value can be returned to the host system to be used in another operation that is to be performed at the host system (e.g., a gaming operation or simulation operation). In the same or alternative embodiments, the random value can be stored with the data received from the host system and can be returned with the data when the data is requested by the host system.

In some embodiments, the operation of the memory sub-system can be modified when the value that is representative of the noise characteristic is determined. For example, a read threshold voltage can be modified to be misaligned relative to an optimal read threshold voltage or an operating temperature of the memory sub-system can be changed. The modification of the operation of the memory sub-system can introduce additional noise to the memory cells to result in increased probability of a random event associated with the noise characteristic of the memory cells occurring or the modification of the operation can increase the sensitivity to noise associated with the noise characteristic of the memory cells and can lead to the increased probability of the random event. Further details with respect to modifying the memory sub-system when the value representative of the noise characteristic is to be determined is described in conjunction with FIG. 7.

Figure 3:
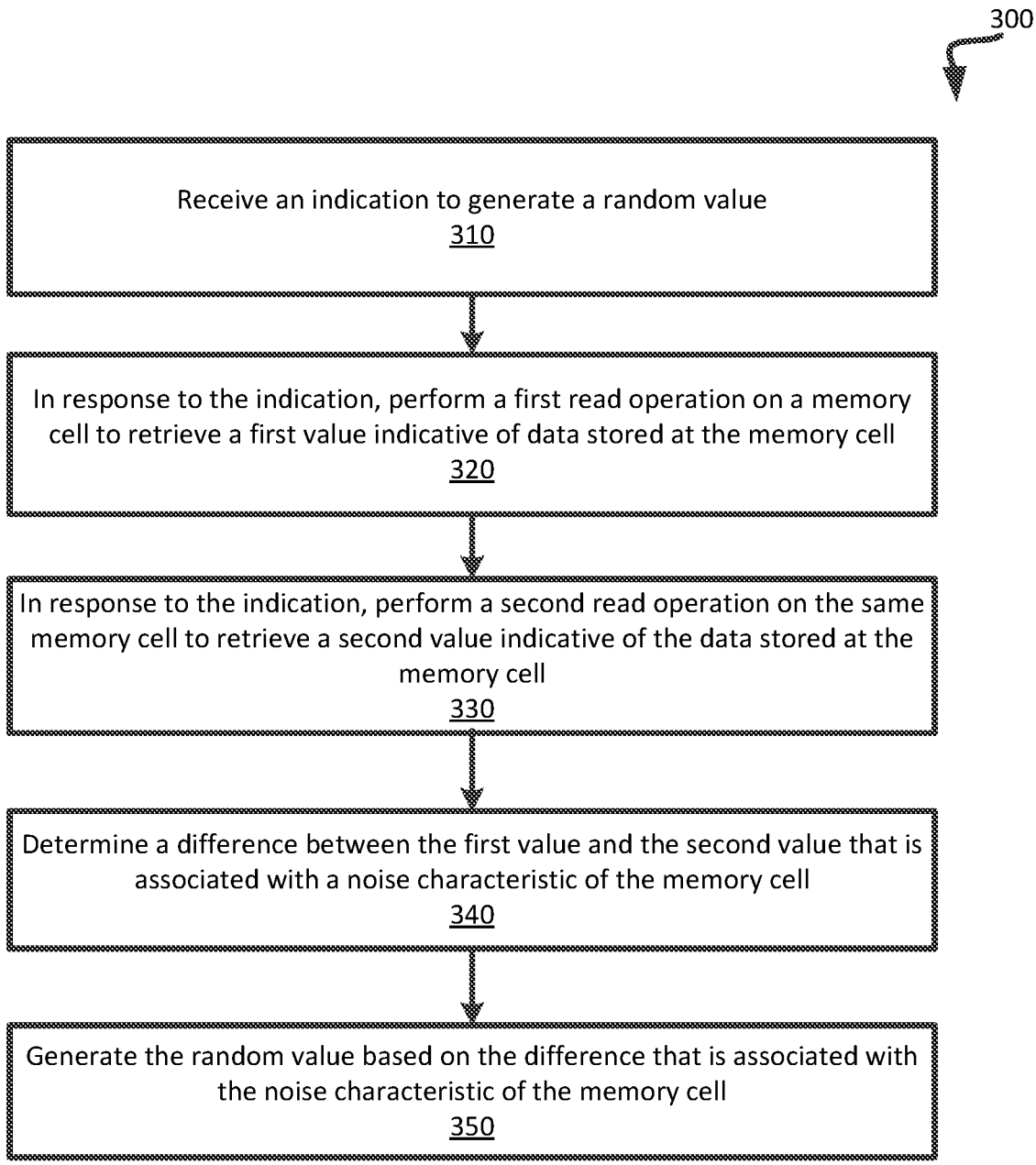
FIG. 3 is a flow diagram of an example method to generate a random value based on a difference between values retrieved from read operations of a memory cell in accordance with some embodiments of the present disclosure.

FIG. 3 is a flow diagram of an example method 300 to generate a random value based on a difference between values retrieved from read operations of a memory cell in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the random number generator component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

As shown in FIG. 3, at operation 310, the processing logic receives an indication to generate a random value. At operation 320, the processing logic performs a first read operation on a memory cell to retrieve a first value indicative of data stored at the memory cell in response to the indication. The first value can be the result of the first read operation that is performed on the memory cell before any error correction operation is performed for the first value. Thus, the first value represents the data that has been stored at the memory cell with any noise characteristics that were present at the memory cell when the first read operation was performed to read the data. At operation 330, the processing logic performs a second read operation on the same memory cell to retrieve a second value indicative of the data stored at the memory cell in response to the indication. For example, the second read operation can be performed to read the data at the same memory cell after the first read operation has been performed. Furthermore, the second value can be the result of the second read operation before or without any error correction operation being performed for the second value. Thus, the second value represents the same data as was read by the first read operation, but can include different noise characteristics that were present or observed at the memory cell when the second read operation was performed to read the data. The first read operation and the second read operation can be performed with a misaligned read threshold voltage as further described in conjunction with FIG. 7.

As shown in FIG. 3, at operation 340, the processing logic determines a difference between the first value and the second value that is associated with a noise characteristic of the memory cell. The difference can be a result of the different noise characteristics that were present or observed at the memory cell during the first read operation and the second read operation. For example, the difference can be determined based on different bit values of the first value resulting from the first read operation and the second value resulting from the second read operation. Since the first read operation and the second read operation are performed on the same data that was stored at the same memory cell, the differences in the read values can be a result of the different noise characteristics of the memory cell. Bits of the random value can then be determined based on particular bits of the first value being different than corresponding bits of the second value.

At operation 350, the processing logic generates the random value based on the difference that is associated with the noise characteristic of the memory cell. For example, the random value can be generated based on particular bits of the first value being different than corresponding bits of the second value as further described below with respect to FIG. 4.

Figure 4:
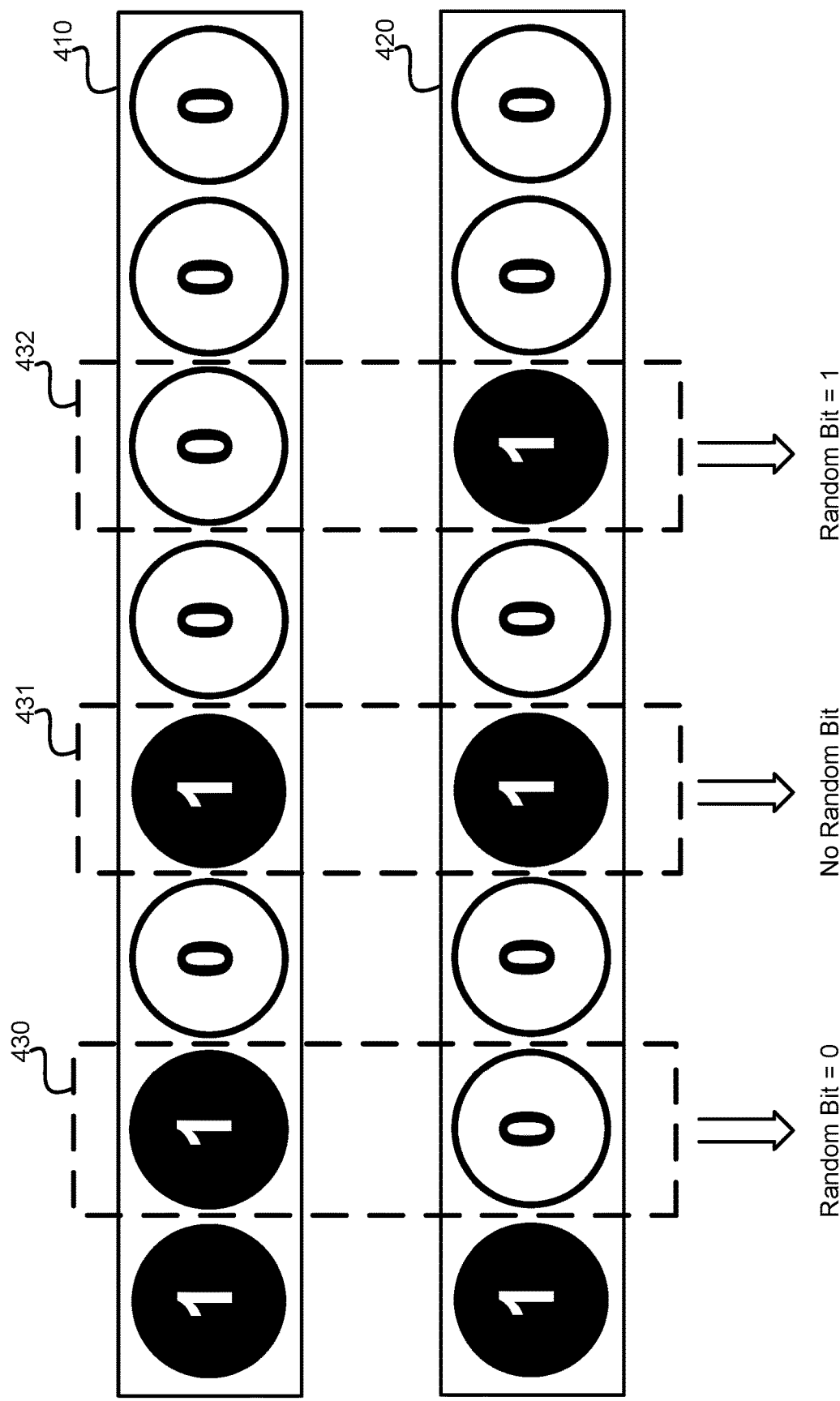
FIG. 4 illustrates the determining of random bit values based on the difference between values retrieved from read operations of a memory cell in accordance with some embodiments of the present disclosure.

FIG. 4 illustrates the determining of random bit values based on the difference between values retrieved from read operations of a memory cell in accordance with some embodiments of the present disclosure. The read operations 410 and 420 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the read operations 410 and 420 are performed by the random number generator component 113 of FIG. 1.

As shown, a first read operation 410 and a second read operation 420 can return values based on data stored at a memory cell. The returned values can represent the result of each of the first read operation 410 and the second read operation 420 before or without any error correction operation being performed on the results of the read operations when reading the data. For example, the data stored at the memory cell can be '11010100' and when the first read operation 410 is performed to read the data, the value that is returned can be '11010000.' Thus, the sixth bit of the value returned by the first read operation can be switched or flipped (e.g., from 1 to 0 or vice versa) as a result of a noise characteristic of the memory cell when the data was read. Furthermore, the same data that is stored or as '11010100' can be returned as '10010100' when the second read operation 420 is performed to read the data. Thus, the second bit of the value returned by the second read operation can be switched or flipped as a result of a noise characteristic of the memory cell when the same data was read for a second time.

The differences in bit values between the values returned for different read operations of the same data can be used to determine bits of the random value. For example, a first bit value of the random value can be determined when a bit of the first value of the first read operation 410 differs from a bit of the second value of the second read operation 420. For example, as shown, the bit values are different for the second bit 430 and the sixth bit 431. A bit of the random value can be determined to be a first value (e.g., a 0) when the bit of the first value is larger than the bit of the second value. As such, for the second bit 430, a bit value for the random value can be a 0. Alternatively, the bit of the random value can be determined to be a different second value (e.g., a 1) when the bit of the first value is less than the bit of the second value. For example, since the sixth bit 432 of the first value is less than the sixth bit of the second value, another bit of the random value can be determined to be 1. Furthermore, at bits where the first value and the second value are the same, no bit can be generated for the random value. For example, no bit of the random value can be generated based on the fourth bit 431.

As such, the differences between bit values of the results of read operations can be used to determine different bits of the random value. Although eight total bits are shown with respect to FIG. 4, any number of bits and read operations can be used to determine different bits that are used to determine the random value. Subsequent pairs of read operations can be performed until a number of bits can be generated for a random value at a particular size. For example, the random value can be a size of eight bits. Pairs of read operations can be performed until eight bits can be generated for the random value. In some embodiments, pairs of read operations can be performed for different memory cells. For example, as shown, the first read operation 410 and the second rea operation 420 can be a first pair of read operations that have been performed on a first memory cell and can be used to generate two random bits out of eight random bits for the random value. A subsequent pair of read operations can be performed on a different memory cell to generate additional random bits. Subsequent pairs of read operations can be performed on different memory cells until eight bits of the random value are generated. In some embodiments, the pairs of read operations can be performed on the same memory cell.

Figure 5:
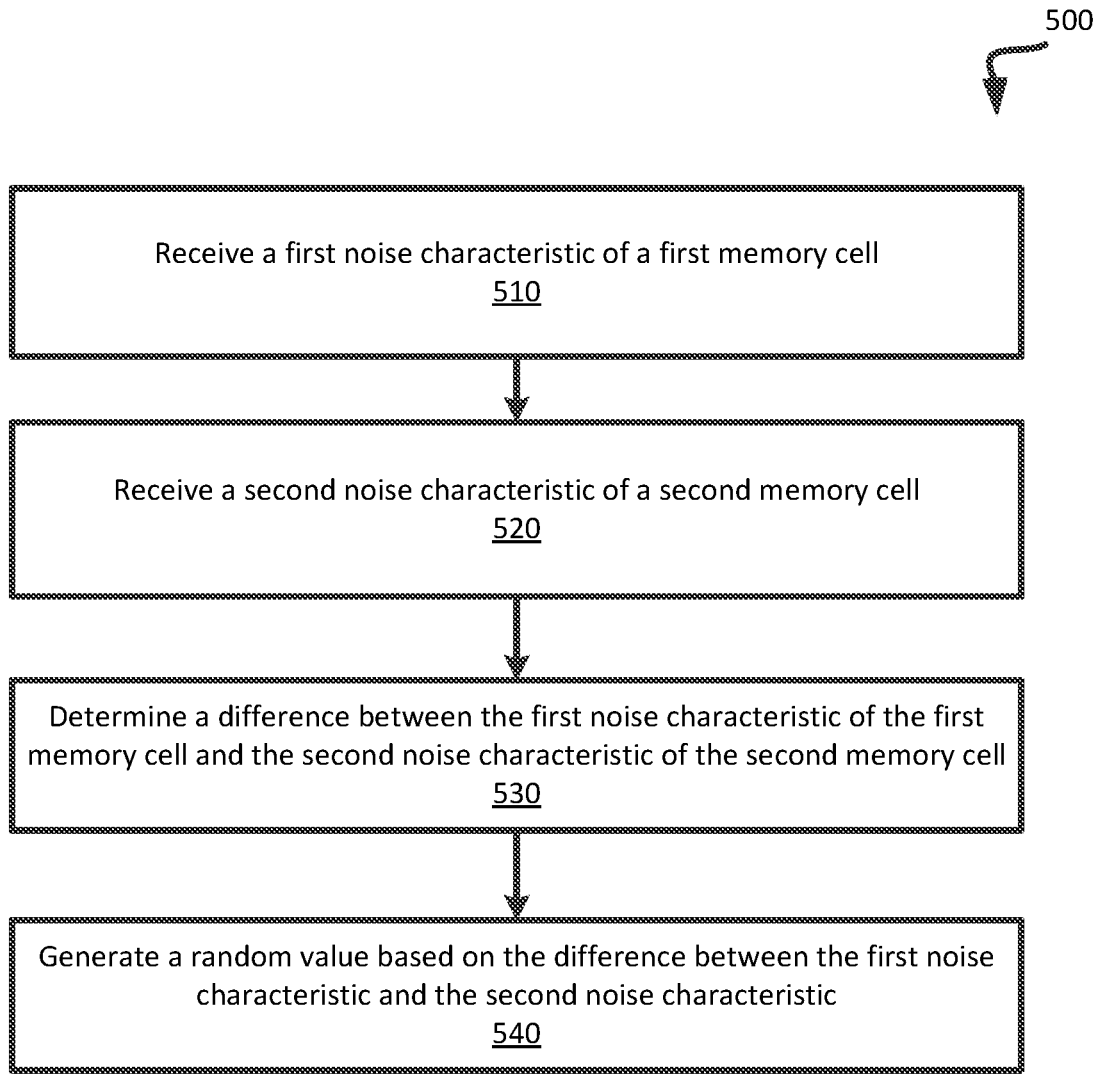
FIG. 5 is a flow diagram of an example method to generate a random value based on a difference between noise characteristics of memory cells in accordance with some embodiments.

FIG. 5 is a flow diagram of an example method 500 to generate a random value based on a difference between noise characteristics of memory cells in accordance with some embodiments. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the random number generator component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

As shown in FIG. 5, at operation 510, the processing logic receives a first noise characteristic of a first memory cell and, at operation 520, receives a second noise characteristic of a second memory cell. The first noise characteristic and the second noise characteristic can be received in response to a request to generate a random value. The first and second noise characteristic can be the raw analog voltage signal from a memory cell and the second noise characteristic can be another raw analog voltage signal from another memory cell. The raw analog voltage signal can be measured from the voltage of the charge from the respective memory cell. The raw analog voltage signal can be observed when data is stored at a memory cell. Furthermore, the raw analog voltage signal can be based on the random telegraph noise of the memory cell in addition to any other electrical or thermal noise characteristics present at the memory cell. At operation 530, the processing logic determines a difference between the first noise characteristic and the second noise characteristic. For example, the analog difference between the first noise characteristic and the second noise characteristic can be determined. Thus, the analog difference between two analog sources (e.g., the first and second noise characteristics) of different memory cells can be determined. Subsequently, at operation 540, the processing logic generates a random value based on the difference between the first noise characteristic and the second noise characteristic. For example, the first noise characteristic and the second noise characteristic can each vary over time. For example, the analog signals of each of the first noise characteristic and second noise characteristic can vary over time and the resulting analog signal of the difference can also vary over time. The varying of the analog signals can be observed as a toggling between voltage levels. The varying or toggling can be used to represent bits of the random value. For example, at particular times, if the first noise characteristic exceeds the second noise characteristic, then a particular bit of the random value can be a 1 and if the first noise characteristic is less than the second noise characteristic at a subsequent time, then another bit of the random value can be a 0. Thus, the toggling or changing of raw analog voltages that represent noise characteristics can be used to generate the different bits of a random value.

In some embodiments, the noise characteristics can be isolated from the raw analog voltage by a high pass filter or other such device that can isolate the noise characteristic from the raw analog voltage at certain frequencies. Furthermore, the difference between the isolated noise characteristics can be determined by a comparator circuit or component that determines a difference between analog noise characteristics. The output of the comparator circuit or component can be received by a non-inverting filter that can increase the gain of the output of the comparator circuit so that the overall gain of the difference between the noise characteristics can reach a particular voltage level (e.g., $V_{cc}$ or 0 volts). Thus, the output of the non-inverting filter can be a particular voltage level that represents the difference of the noise characteristics. The output or difference of the noise characteristics can subsequently be used to generate a synchronous random value as described in further detail below.

In some embodiments, the first noise characteristic can be generated at a first time and a value representative of the first noise character can be stored at a first memory element. The second noise characteristic can be generated at a second time and another value representative of the second noise characteristic can be stored at a second memory element. The first value and the second value can be compared with each other when a random value is to be generated.

Figure 6:
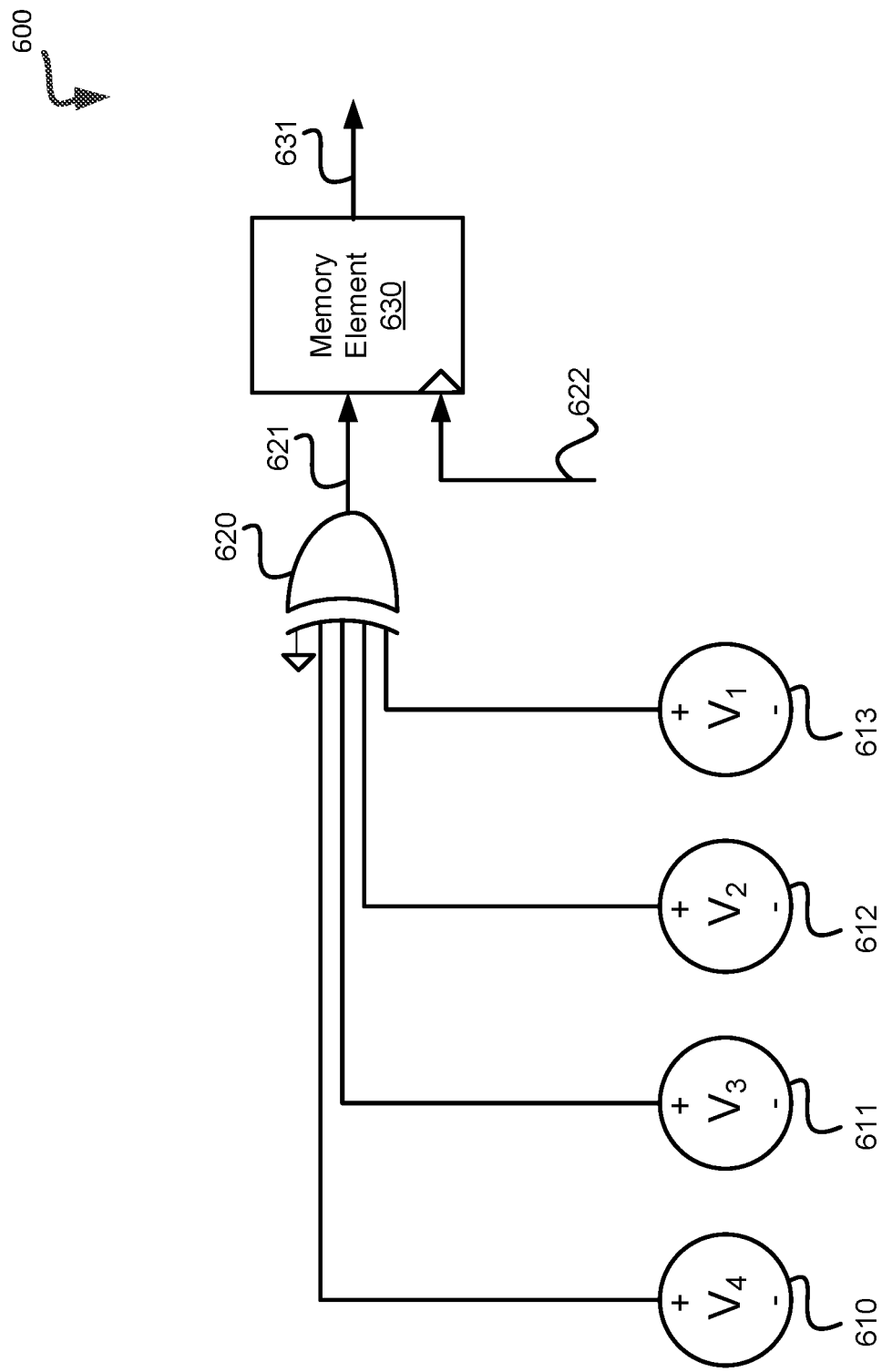
FIG. 6 illustrates an example hardware architecture to generate a random value based on a difference between noise characteristics of memory cells in accordance with some embodiments of the present disclosure.

FIG. 6 illustrates an example hardware architecture 600 to generate a random value based on a difference between noise characteristics of memory cells in accordance with some embodiments of the present disclosure. The architecture 600 can represent processing logic that can include hardware (e.g., processing device, circuitry, dedicated logic, programmable logic, microcode, hardware of a device, integrated circuit, etc.), software (e.g., instructions run or executed on a processing device), or a combination thereof. The architecture 600 can be used by the random number generator component 113 of FIG. 1.

As shown in FIG. 6, the architecture 600 can include multiple noise sources 610, 611, 612, and 613. Each of the noise sources 610, 611, 612, and 613 can represent the difference between noise characteristics of two memory cells as previously described. For example, each noise source can provide an output that represents the difference between two noise characteristics of two memory cells and the output can change over time. A logical component 620 can receive the output of each of the noise sources 610, 611, 612, and 613. For example, the logical component 620 can receive multiple representations of a difference between two noise characteristics of two memory cells. For example, the output of the noise source 610 can be the difference between noise characteristics of a first pair of memory cells and the output of the noise source 611 can be the difference between noise characteristics of a second and different pair of memory cells. The logical component 620 can be an exclusive-or (XOR) component or an exclusive-nor (XNOR) component. Since the output of the logical component 620 can be toggled or switched (e.g., change value) based on differences that occur over time from any of the noise sources 610, 611, 612, and 613, the output 621 can represent more bits of a random value than a single noise source can provide during the same time period. For example, the output 621 of the logical component 620 can toggle or switch more frequently to represent different bits of a random value than a single noise source 610, 611, 612, and 613. As a result, lower bandwidth noise sources can be aggregated to generate a higher bandwidth output 621. Furthermore, a memory element 630 (e.g., a flip-flop) can be used to generate a synchronous output signal 631 that can represent the random value. For example, a clock signal 622 can be provided to the memory element 630 to generate the synchronous output signal 631.

As a result, multiple lower bandwidth noise sources can provide multiple asynchronous signals that represent differences between noise characteristics. As previously described, such lower bandwidth noise sources can be included in the memory sub-system. The asynchronous signals can be used to generate a higher bandwidth signal that is used to generate a synchronous random value. Thus, the lower bandwidth noise sources that are currently available in the memory sub-system can be used to generate a higher bandwidth random number generator (e.g., a quantum random number generator) with the existing hardware of the memory sub-system.

Figure 7:
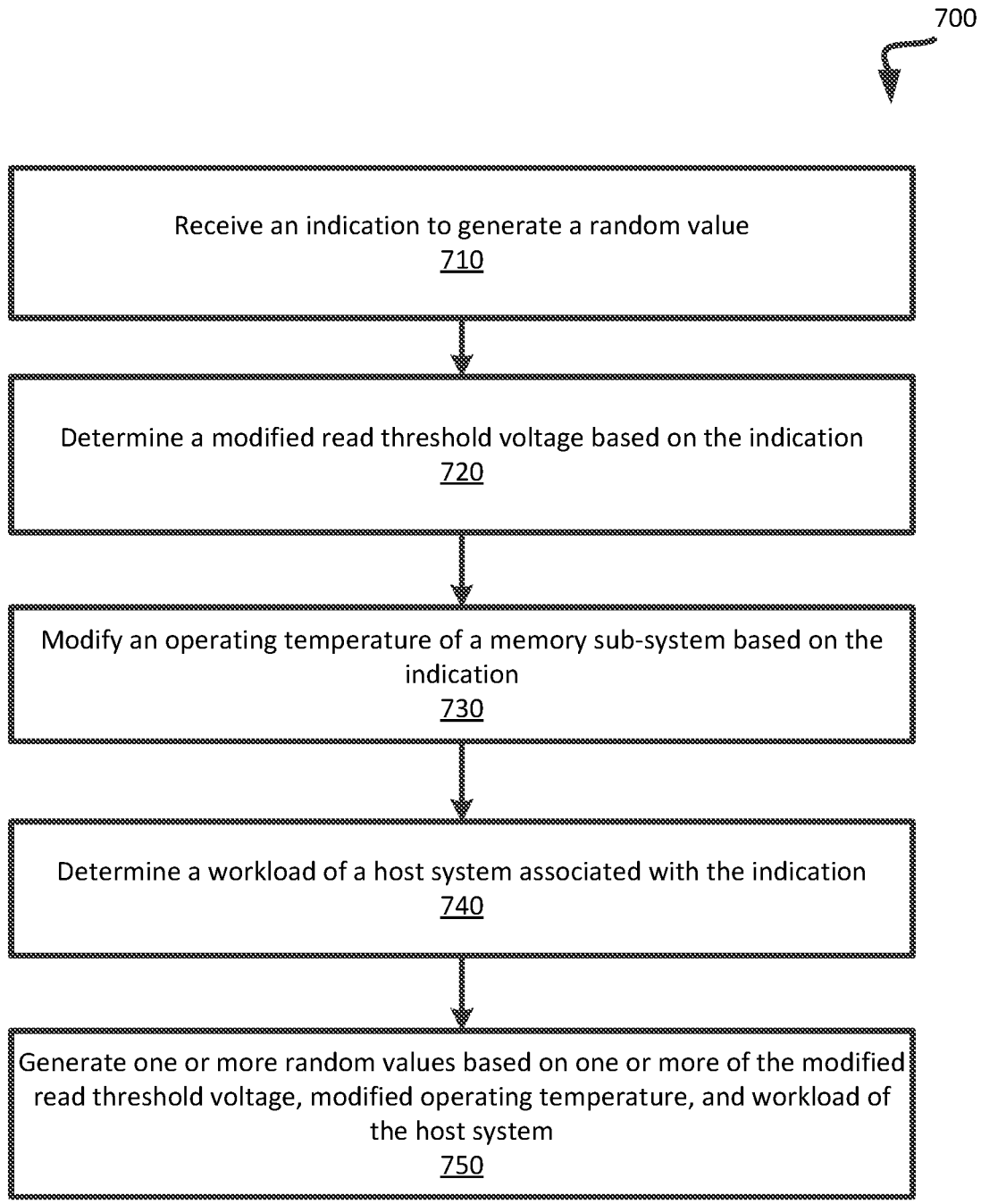
FIG. 7 is a flow diagram of an example method to generate a random value based on one or more characteristics of a memory sub-system in accordance with some embodiments.

FIG. 7 is a flow diagram of an example method 700 to generate a random value based on one or more characteristics of a memory sub-system in accordance with some embodiments. The method 700 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 700 is performed by the random number generator component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

As shown in FIG. 7, at operation 710, the processing logic receives an indication to generate a random value. At operation 720, the processing logic determines a modified read threshold voltage based on the indication. In some embodiments, a particular read threshold voltage can be applied to a memory cell to read data at the memory cell. The particular read threshold voltage can be at a voltage level that is intended to result in the fewest number of errors when the particular read threshold voltage is applied to the memory cell to read data (i.e., bit values) stored at the memory cell. The modified read threshold voltage can be misaligned or changed from the particular read threshold voltage that is intended to result in the fewest number of errors. For example, the modified read threshold voltage can be a read voltage threshold that is changed or modified from a prior read threshold voltage that was used to read data at a memory cell for a prior read operation without generating a random number. The misaligning or changing of the read threshold voltage can introduce additional error in the values retrieved by read operations due to increased sensitivity to the noise characteristics that can be present at the memory cell. For example, more bits of different read operations of the same data can be expected to be different due to the increased sensitivity to the noise characteristics.

At operation 730, the processing logic modifies an operating temperature of a memory sub-system based on the indication. For example, a temperature control element (e.g., a heating element or cooling element) can be activated to change the operating temperature of the memory sub-system when a random number is to be generated. The temperature control element can be included in the memory sub-system or can be connected to the memory sub-system and can increase or decrease the operating temperature of the memory sub-system. The changing of the operating temperature (e.g., increasing or decreasing of temperature) can result in added noise to the memory cells that can contribute to more randomness of the noise characteristics of the memory cells. Thus, a bandwidth or output of random values can be increased when the operating temperature of the memory sub-system is changed as the probability of a random event associated with the noise characteristic is increased.

As shown in FIG. 7, at operation 740, the processing logic determines a workload of the host system associated with the indication. The workload can identify a number or amount of random values that are to be needed. For example, the workload can indicate an amount of user data that is to be stored at the memory sub-system in an encrypted format. In some embodiments, the workload can identify a type of application utilized by the host system (e.g., a Monte Carlo method, gaming environment, etc.) where the type of application can indicate whether a large number or a small number of random values are to be requested. Thus, the workload can be used to indicate a number of random values that are to be requested by the host system or to be generated for the host system.

At operation 750, the processing logic generates one or more random values based on one or more of the modified read threshold voltage, modified operating temperature, and workload of the host system. For example, the modified read threshold voltage can be used to perform read operations as described with respect to FIGS. 3 and 4 when the modified operating temperature has been applied to the memory sub-system. In some embodiments, the noise characteristics can be determined (e.g., with respect to FIGS. 5 and 6) when the modified operating temperature has been applied.

In some embodiments, if the workload of the host system is identified as requiring a number of random values that exceeds a threshold number (e.g., a large amount of data is to be encrypted) or the type of application used by the host system will require or is typical of requiring a large number of random values, then the generating of the random values can be based on the workload to increase the generation of the random values. For example, if random values are being generated based on a comparison of values of two read operations, then multiple read operations can be performed at the same time to generate multiple random values. In some embodiments, a larger number of memory cells can be subjected to a read operation when more random values are to be generated. In some embodiments, more noise sources can be used to generate a higher frequency random value when a higher number of random values are to be generated. For example, different noise sources can be utilized to generate random values based on the workload. Thus, the number of memory cells used to generate the random values can be based on the workload of a host system.

Figure 8:
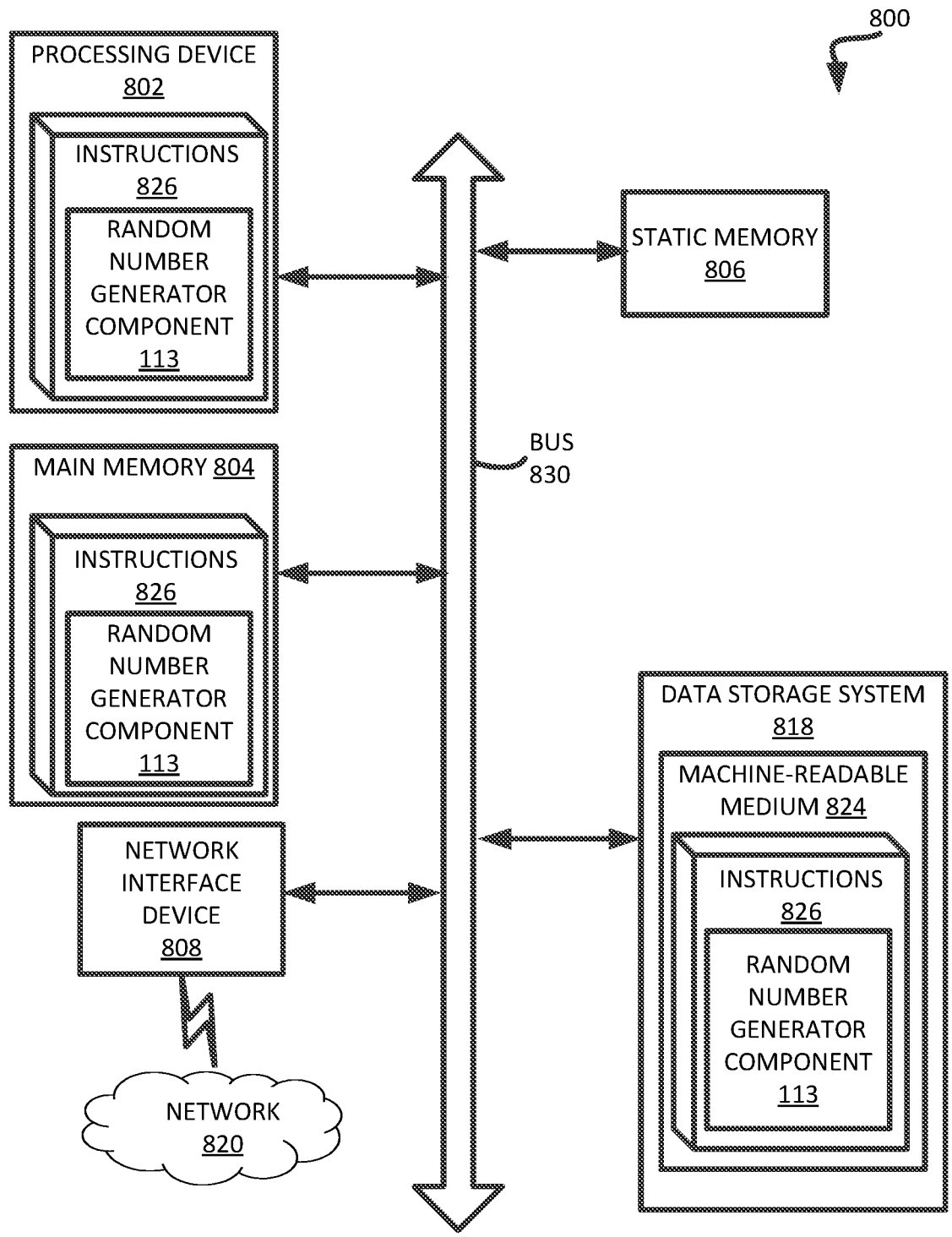
FIG. 8 is a block diagram of an example computer system in which implementations of the present disclosure can operate.

FIG. 8 illustrates an example machine of a computer system 800 within which a set of instructions, for causing the machine to perform any one or more of the methodologies discussed herein, can be executed. In some embodiments, the computer system 800 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the random number generator component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, digital or non-digital circuitry, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 800 includes a processing device 802, a main memory 804 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a data storage system 818, which communicate with each other via a bus 830.

Processing device 802 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 802 can also be one or more special-purpose processing devices such as an application specific integrated circuit (ASIC), a field programmable gate array (FPGA), a digital signal processor (DSP), network processor, or the like. The processing device 802 is configured to execute instructions 826 for performing the operations and steps discussed herein. The computer system 800 can further include a network interface device 808 to communicate over the network 820.

The data storage system 818 can include a machine-readable storage medium 824 (also known as a computer-readable medium) on which is stored one or more sets of instructions 826 or software embodying any one or more of the methodologies or functions described herein. The instructions 826 can also reside, completely or at least partially, within the main memory 804 and/or within the processing device 802 during execution thereof by the computer system 800, the main memory 804 and the processing device 802 also constituting machine-readable storage media. The machine-readable storage medium 824, data storage system 818, and/or main memory 804 can correspond to the memory sub-system 110 of FIG. 1.

In one embodiment, the instructions 826 include instructions to implement functionality corresponding to a random number generator component (e.g., the random number generator component 113 of FIG. 1). While the machine-readable storage medium 824 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
a memory component; and
a processing device, operatively coupled with the memory component, to:
receive a request to generate one or more random values;
in response to receiving the request to generate the one or more random values;
perform a first read operation on a memory cell of the memory component to retrieve first data using an optimal read threshold voltage for the memory cell configured to have a fewest number of read errors;
determine a misaligned read threshold voltage for the memory cell different from the optimal read threshold voltage; and
perform a second read operation on the same memory cell of the memory component to retrieve second data using the misaligned read threshold voltage;
compare a first value of a first bit of the first data with a second value of a second bit of the second data to identify a difference between the first value of the first bit of the first data and the second value of the second bit of the second data, the difference being associated with a noise characteristic of the memory cell;
determine whether the difference is one of a first difference associated with the noise characteristic of the memory cell or a second difference associated with the noise characteristic of the memory cell, wherein the first difference is indicative of the first value of the first bit of the first data exceeding the second value of the second bit of the second data, and wherein the second difference is indicative of the second value of the second bit of the second data exceeding the first value of the first bit of the first data; and
generate at least one bit of the one or more random values, wherein the at least one bit has a first bit value or a second bit value, wherein the first bit value is responsive to the difference between the first value of the first bit of the first data and the second value of the second bit of the second data being the first difference associated with the noise characteristic of the memory cell and the second bit value is responsive to the difference between the first value of the first bit of the first data and the second value of the second bit of the second data being the second difference associated with the noise characteristic of the memory cell.

2. The system of claim 1, wherein the noise characteristic is a random telegraph noise of the memory cell.

3. The system of claim 2, wherein the noise characteristic is a combination of the random telegraph noise and electrical or thermal noise associated with the memory cell.

4. The system of claim 1, wherein to compare the first data with the second data to identify the difference, the processing device is further to:
determine a bit value of a particular bit of the first data;
determine another bit value of a corresponding bit of the second data; and
generate a value to represent a particular random value of the one or more random values based on a comparison between the bit value of the particular bit and the another bit value of the corresponding bit.

5. The system of claim 1, wherein the performing of the first read operation and the second read operation are based on the misaligned read threshold voltage.

6. The system of claim 5, wherein the misaligned read threshold voltage is changed from a prior read threshold voltage that was used to perform a prior read operation.

7. The system of claim 1, wherein the processing device is further to:

in response to receiving the request to generate the one or more random values, activate a heating element or a cooling element to increase or decrease an operating temperature of the memory component, wherein the performing of the first read operation and the second read operation is in response to the increase or decrease in the operating temperature.

8. The system of claim 1, wherein the processing device is further to:
determine a workload of a host system, the workload being based on user data from the host system; and
perform additional read operations on one or more additional memory cells, wherein a number of the one or more additional memory cells is based on the determined workload of the host system, and wherein the generated one or more random values are further based on a difference associated with the additional read operations on the one or more additional memory cells.

9. The system of claim 1, wherein the processing device is further to:
receive data from a host system to be stored at a memory sub-system associated with the memory component;
encrypt the received data based on the generated one or more random values; and
store the encrypted data at the memory sub-system.

10. A method comprising:
performing a first read operation on a memory cell to retrieve a first data indicative of a first noise characteristic of the memory cell using an optimal read threshold voltage for the memory cell configured to have a fewest number of read errors;
determining a misaligned read threshold voltage for the memory cell different from the optimal read threshold voltage;
performing a second read operation on the same memory cell to retrieve a second data indicative of a second noise characteristic of the memory cell using the misaligned read threshold voltage;
determining whether a difference between a first value of a first bit of the first data and a second value of a second bit of the second data is one of a first difference or a second difference, wherein the first difference is indicative of the first value of the first bit of the first data exceeding the second value of the second bit of the second data, and wherein the second difference is indicative of the second value of the second bit of the second data exceeding the first value of the first bit of the first data; and
generating, by a processing device, at least one bit of a random value, wherein the at least one bit has a first bit value or a second bit value, wherein the first bit value is responsive to the difference between the first value of the first bit of the first data and the second value of the second bit of the second data being the first difference indicative of one or more of the first noise characteristic or the second noise characteristic and the second bit value is responsive to the difference between the first value of the first bit of the first data and the second value of the second bit of the second data being the second difference indicative of one or more of the first noise characteristic or the second noise characteristic.

11. The method of claim 10, wherein the first noise characteristic is a random telegraph noise of the first memory cell and the second noise characteristic is another random telegraph noise of the second memory cell.

12. The method of claim 10, further comprising:
generating a first noise signal by isolating the first noise characteristic from an analog signal of the first memory cell; and
generating a second noise signal by isolating the second noise characteristic from an analog signal of the second memory cell, wherein the determining of the difference between the first noise characteristic and the second noise characteristic is further based on a comparison of the first noise signal with the second noise signal.

13. The method of claim 12, further comprising:
performing a comparison operation between the first noise signal and the second noise signal to generate the random value; and
outputting a synchronous random value based on a clock signal and the random value generated by the comparison operation.

14. The method of claim 12, wherein the first noise characteristic of the first memory cell is generated at a first time and stored at a first memory element, and wherein the second noise characteristic of the second memory cell is generated at a second time and stored at a second memory element.

15. The method of claim 10, further comprising:
determining a workload of a host system, the workload being based on user data of the host system; and
receiving one or more additional noise characteristics of one or more additional memory cells, wherein a number of the one or more additional memory cells is based on the determined workload of the host system, and wherein the random value is further generated based on the one or more additional noise characteristics.

16. The method of claim 10, further comprising:
receiving data from a host system to be stored at a memory sub-system;
encrypting the received data based on the generated random value; and
storing the encrypted data at the memory sub-system.

17. A non-transitory computer-readable storage medium comprising instructions that, when executed by a processing device, cause the processing device to perform operations comprising:
receiving a request to generate one or more random values;
in response to receiving the request to generate the one or more random values:
performing a first read operation on a memory cell of a memory component to retrieve first data using an optimal read threshold voltage for the memory cell configured to have a fewest number of read errors;
determining a misaligned read threshold voltage for the memory cell different from the optimal read threshold voltage; and
performing a second read operation on the same memory cell of the memory component to retrieve second data using the misaligned read threshold voltage;
comparing a first value of a first bit of the first data with a second value of a second bit of the second data to identify a difference between the first value of the first bit of the first data and the second value of the second bit of the second data, the difference being associated with a noise characteristic of the memory cell;
determining whether the difference is one of a first difference associated with the noise characteristic of the memory cell or a second difference associated with the noise characteristic of the memory cell, wherein the first difference is indicative of the first value of the first bit of the first data exceeding the second value of the second bit of the second data, and wherein the second difference is indicative of the second value of the second bit of the second data exceeding the first value of the first bit of the first data; and generating at least one bit of the one or more random values, wherein the at least one bit has a first bit value or a second bit value, wherein the first bit value is responsive to the difference between the first value of the first bit of the first data and the second value of the second bit of the second data being the first difference associated with the noise characteristic of the memory cell and the second bit value is responsive to the difference between the first value of the first bit of the first data and the second value of the second bit of the second data being the second difference associated with the noise characteristic of the memory cell.

18. The non-transitory computer-readable storage medium of claim 17, wherein the noise characteristic is a random telegraph noise of the memory cell.

19. The non-transitory computer-readable storage medium of claim 17, wherein to compare the first data with the second data to identify the difference, the operations further comprise:
  determining a bit value of a particular bit of the first data;
  determining another bit value of a corresponding bit of the second data; and
  generating a value to represent a particular random value of the one or more random values based on a comparison between the bit value of the particular bit and the another bit value of the corresponding bit.

20. The non-transitory computer-readable storage medium of claim 17, wherein
  the performing of at least one of the first read operation or the second read operation is based on the misaligned read threshold voltage, and wherein the misaligned read threshold voltage is changed from another read threshold voltage that was used to perform a prior read operation.

* * * * *